Oct. 14, 1969  H. GANG  3,472,450
REGISTERING MECHANISM

Filed April 25, 1967  3 Sheets-Sheet 1

INVENTOR
HERMAN GANG
BY *Stephen E. Feldman*
ATTORNEY

Oct. 14, 1969   H. GANG   3,472,450
REGISTERING MECHANISM
Filed April 25, 1967   3 Sheets-Sheet 2

INVENTOR
HERMAN GANG
BY Stephen E. Feldman
ATTORNEY

Oct. 14, 1969   H. GANG   3,472,450
REGISTERING MECHANISM
Filed April 25, 1967   3 Sheets-Sheet 3
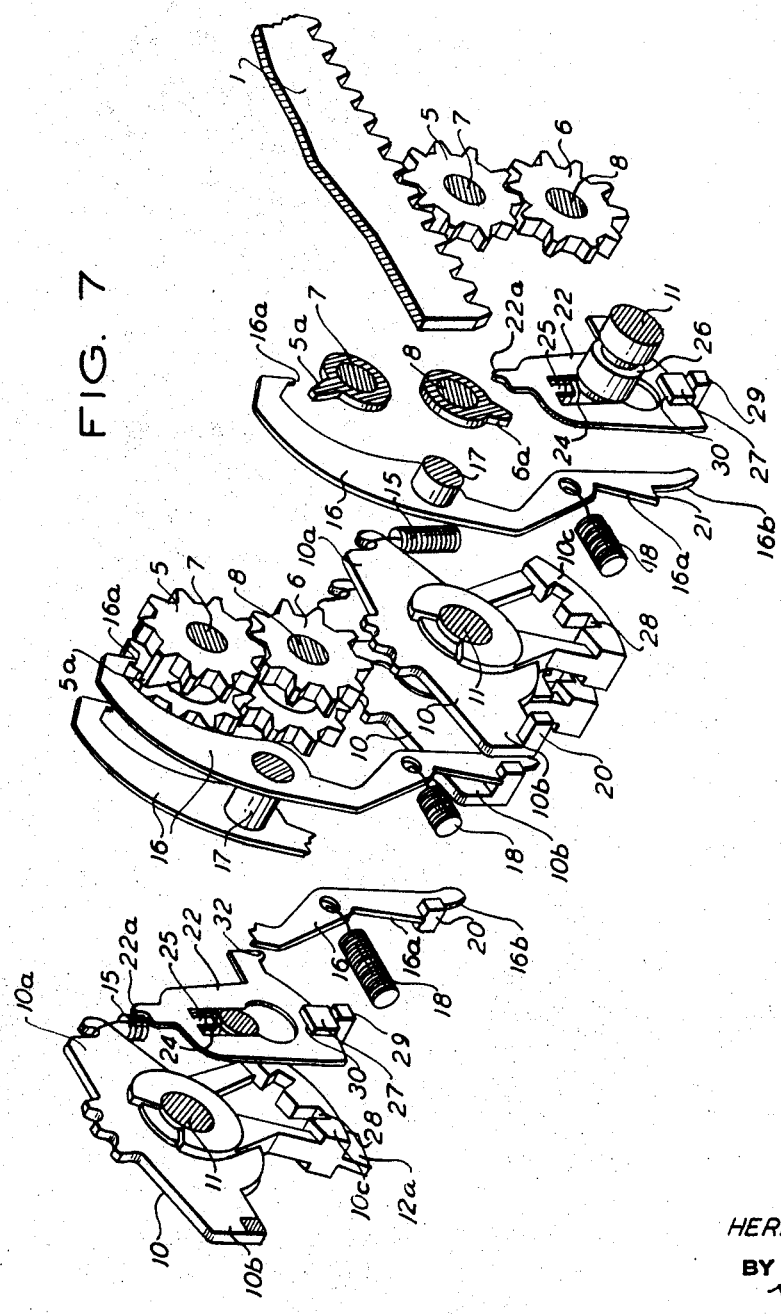
INVENTOR
HERMAN GANG
BY
ATTORNEY

United States Patent Office 3,472,450
Patented Oct. 14, 1969

3,472,450
REGISTERING MECHANISM
Herman Gang, Morris Plains, N.J., assignor to Litton
Business Systems, Inc., a corporation of New York
Filed Apr. 25, 1967, Ser. No. 633,449
Int. Cl. G06c 7/10, 9/00, 15/26
U.S. Cl. 235—137                               15 Claims

ABSTRACT OF THE DISCLOSURE

A calculating machine register with associated tens transfer means for simultaneously performing primary and and secondary transfers. In a primary transfer, tripping of an arm by a register wheel as the wheel moves from a first to a second registering position enables an actuator for a primary transfer operation. The actuator is then moved by a transfer bail to add or subtract one from the next higher order register wheel. For secondary transfers, a shiftable member is moved into a position by a register wheel, as the register is moved to a lowered position, to connect two adjacent actuators, so that if one of the two is moved in a primary transfer, as aforementioned by the transfer bail, the other will be moved in a secondary transfer to add or subtract one from its associated register wheel.

Background of the invention

Basically, there are two types of transfers in calculating machine operation, primary and secondary. In the former, the transfer mechanism is operable to add one unit to, or to subtract one unit from the next higher order register wheel, after a register wheel moves from 9 to 0 in additive registration or from 0 to 9 in subtractive registration.

In a secondary tens transfer, the transfer mechanism is operable in additive registration to move each of the wheels of a series of wheels to 0 and to add one unit to the next higher order wheel when the series of register wheels stands at 9, and the next lower order wheel is moved additively from 9 to 0, and in subtractive registration to move each of the wheels of a series of wheels to 9 and to subtract one unit from the next higher order wheel when the series of wheels stand at 0 and the next lower order wheel is moved from 0 to 9.

In the prior art, secondary transfer mechanisms were often quite slow in that they had to complete one function before starting the next. In these mechanisms, the secondary transfer means had to be enabled before or after the register was shifted from the rack engaging position to the tens transfer position. The need for enabling the mechanism before or after shifting took sufficient time so that the whole machine operation was slowed down as a result. Thus it would be advantageous if the transfer means could be enabled during the process of shifting the register. This would avoid any loss of time in enabling the transfer means and thereby speed up the whole machine process.

Further, secondary transfer in the prior art were often done by having a transfer tooth of a register wheel which was being moved in a transfer operation move the next higher order actuator which would advance its associated register wheel and so on. Because the movement was accomplished by the transfer tooth itself, a strain was put on the tooth that could possibly lead to ultimate failure. It would be more desirable to provide a tens transfer mechanism wherein the transfer teeth of the register wheels do not move the transfer actuators themselves, but simply enable members, which serve in turn to interconnect actuators so that when one actuator is moved it will move the adjacent higher order actuator to thereby avoid this strain on the register wheels and provide a more reliable and efficient mechanism.

Also, many of the prior art simultaneous tens transfer mechanisms were complex devices which required many parts. They were expensive mechanisms that were prone to malfunctioning because of the number of parts. Thus it would be advantageous if a simultaneous tens transfer mechanism could be provided which had significantly fewer parts so that its cost of construction and its aptness to malfunction would both be significantly reduced.

Summary of the invention

By way of achieving these advantages, there is provided a calculating machine register with an associated simultaneous tens transfer mechanism which includes a transfer actuator for each wheel of an ordinal series of register wheels. Each transfer actuator is shiftable to an enabled position wherein a connection is effected between the transfer actuator of the next higher order and a drive means in order to provide a primary transfer operation. In a secondary transfer operation, each register wheel that is about to move between a first and a second registering position enables normally disabled means by the register being lowered from the rack engaging position to the tens transfer position to interconnect its transfer actuator with the next higher order actuator so that if the former is moved in a primary transfer operation, the latter will be moved in a secondary transfer operation. The drive means then simultaneously moves the actuators that have been enabled for a primary transfer and any actuators which are connected to these actuators by the aforementioned secondary transfer enabling operation. As the actuators are moved, the register wheels are advanced by being intermeshed with their respective actuators.

Brief description of the drawings

FIG. 7 is a fragmentary exploded perspective view of the three highest orders of the registering mechanism of FIG. 1.

Description of the preferred embodiment

Figure 1:
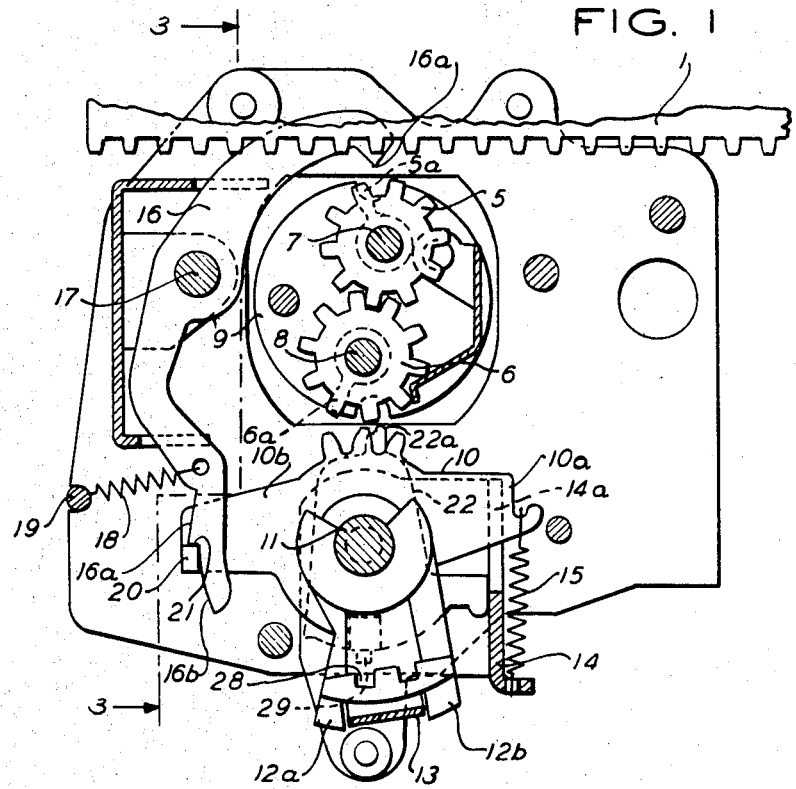
FIG. 1 is a view of the mechanism embodying the invention.

The registering mechanism of our invention may be employed with either a ten key or a full keyboard type calculating machine. The calculating machine includes an ordinal series of digital actuator racks 1 which are normally held toward the left (FIGS. 1 and 2) against the tension of springs 2 by a restoring bail 3. During each machine cycle, bail 3 is moved toward the right in a forward stroke and then restored in a return stroke. Cyclically operable drive means and means operable thereby for imparting forward and return stokes to bail 3 and other mechanisms in timed relationship as later described are well known in the art, and therefore are not shown or described.

During the forward stroke of bail 3, springs 2 move actuator racks 1 in forward excursions until they are arrested in positions corresponding to the values of depressed keys of associated key columns in a full keyboard machine, or in positions corresponding to the settings of the columns of a selector carriage of a machine of the ten key type. During its return stroke, bail 3 engages racks 1 in their respective forward positions and restores them to their normal leftmost position.

The register is of the well-known algebraic type wherein a set of add pinions 5 are intermeshed with a set of subtract pinions 6. Pinions 5 and 6 are mounted respectively on shafts 7 and 8 which are supported by a cradle comprising a pair of end plates 9. When add pinions 5 stand at normal cleared 0 position, subtract pinions 6 stand at the complemental 9 position. Either set of pinions 5 or 6 may be in position for engagement with racks 1 and upon reversing of cradle 9 through 180° the opposed set of intermeshed pinions will be brought into position for engagement with the racks.

Normally, register 5–6 is in an intermediate position out of engagement with digital actuator racks 1 and opposed tens transfer actuators 10, hereinafter described. Racks 1 move idly in their forward excursions, and then cradle 9 is moved upwardly to engage either add gears 5 or subtract gears 6 with the racks. Thus during their return strokes, racks 1 will enter the selected values into register 5–6. The arrangement is such that when gears 5 are engaged for additive registration, subtract gears 6 will be rotated reversely to register the 9's complement therein, and when gears 6 are engaged for subtractive registration, add gears 5 will be rotated to effect subtractive registration therein.

Figure 3:
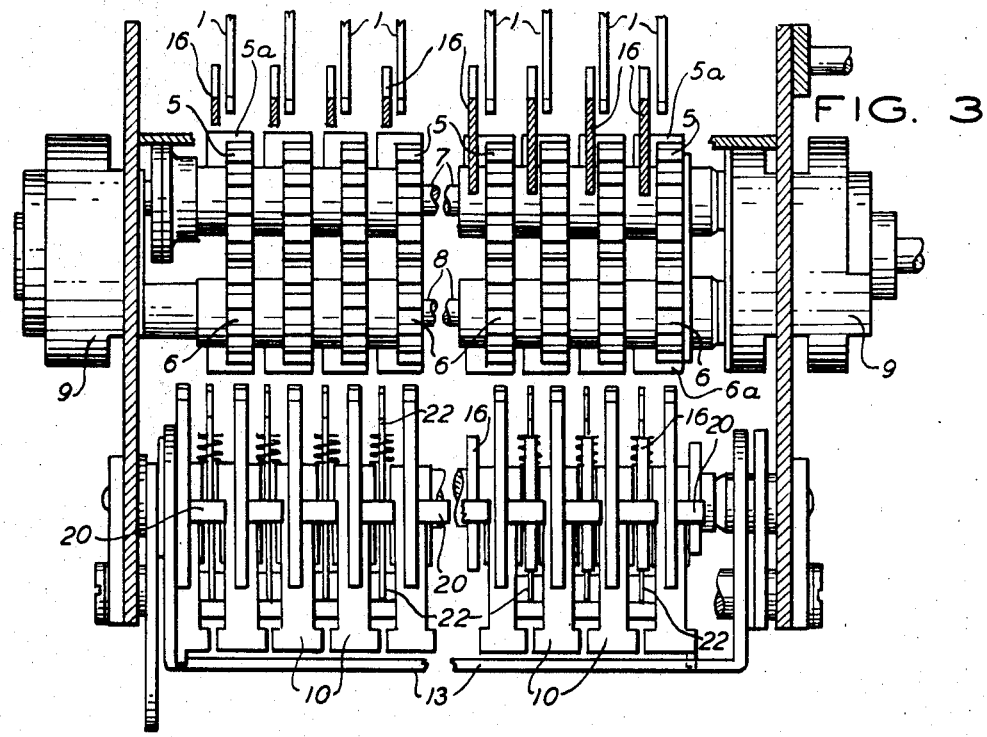
FIG. 3 is a sectional view taken on line 3—3 of FIG. 1, with parts broken away and removed.
Figure 4:
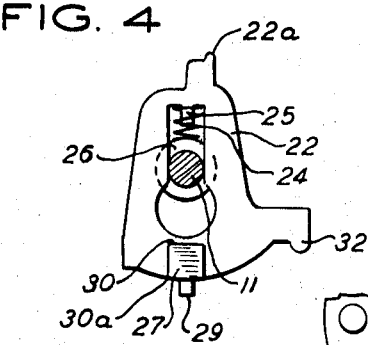
FIG. 4 is a view of the connecting member which interconnects adjacent actuators for a secondary transfer.

After registration, register 5–6 is moved from engagement with racks 1 and into engagement with actuators 10 for tens transfer registration, as will be subsequently described. Upon completion of the tens transfer operation, the register is restored to its normal intermediate position as shown in FIGS. 1 and 3, thereby completing a cycle of registration.

Tens transfer actuators 10 are in the form of gear segments loosely mounted for rocking movement on a shaft 11 below register pinions 5, 6.

Figure 2:
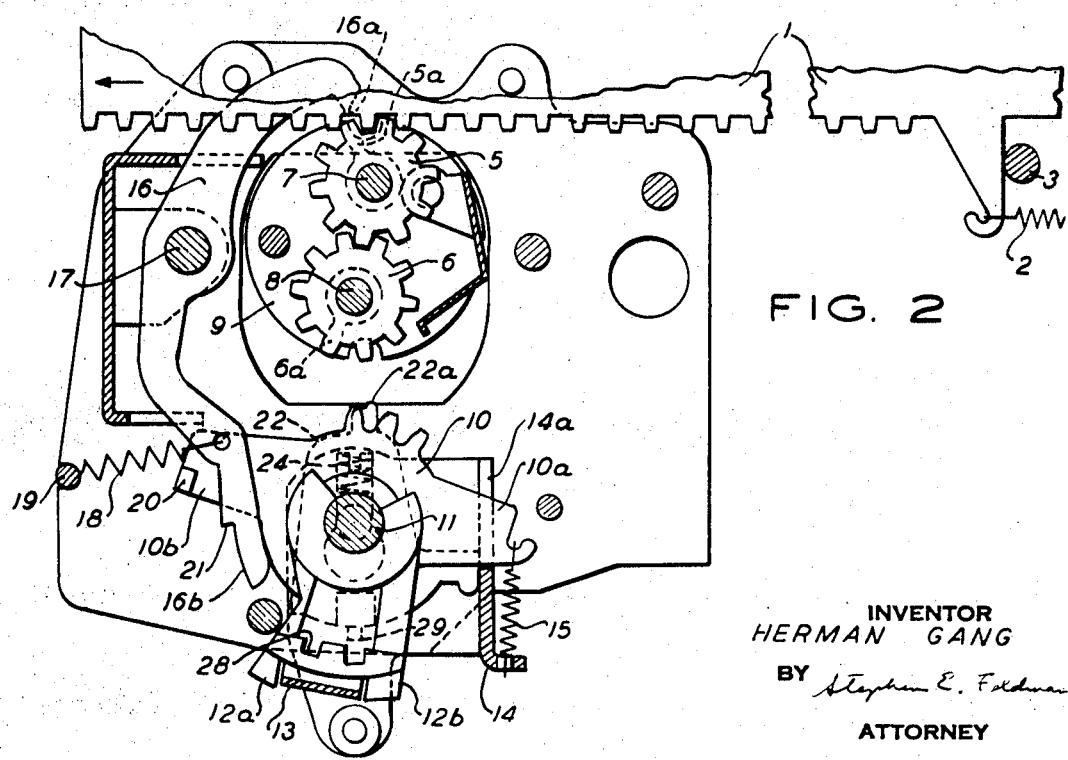
FIG. 2 is a view of the mechanism of FIG. 1 in an operated position.

Each transfer gear segment 10 includes a rightwardly extending arm 10a and a leftwardly extending arm 10b (FIGS. 1 and 2). A bail 14 having upwardly extending fingers 14a which are positioned between actuator segments 10, is movably held in a clockwise position below and surrounding arms 10a of the actuator segments. The bail 14 in operation rocks actuator segments 10 from the position of FIG. 2 to the position of the front segment of FIG. 6. This will be described in greater detail subsequently.

Associated with each order of pinions 5, 6 is a conditioning or enabling lever 16. These levers are substantially vertically disposed and are rockably mounted on a shaft 17 to the left of register pinions 5, 6 (as shown in FIGS. 1 and 2). These levers are positioned for transfer purposes so that the top of the lever is associated with lower order pinions 5, 6 and the bottom with the transfer actuator of the next higher order pinions 5, 6. They thereby are able to be actuated by a pinion in one order to cause a unit to be entered in the next higher order.

Levers 16 are normally in the clockwise position of FIG. 1. When in this position, a nose 16a at the upper end of each lever is in the path of movement of the tooth extensions or transfer teeth 5a or 6a of the associated pinions 5, 6 when said pinions respectively are engaged with rack 1 for digital registration. In the lowest order of FIG. 7 (the rightmost order) these transfer teeth 5a and 6a are shown broken away and removed to the left.

In the normal position of levers 16 as shown in FIG. 1, a notch 21 in the lower left edge of the lever engages a projection 20 which extends perpendicularly from the leftwardly extending arm 10b of the next higher order segment to hold each segment in the normal position of FIG. 1.

For a primary transfer, after the return effective digital registering strokes of racks 1, as indicated by the arrow (FIG. 2), lever 16 will be rocked counterclockwise by a tooth extension 5a or 6a of a pinion engaging the nose 16a of the lever. Due to this movement, projection 20 of the segment associated with the next higher order register wheels is released from notch 21 of lever 16 and spring 15 which is connected between bail 14 and arm 10a of segment 10 biases the segment clockwise to the position of FIG. 2, wherein arm 10a is in abutting contact with bail 14. With the parts in this position, cradle 9 is moved downwardly from the position of FIG. 2, to engage the associated pinion 5 or 6 with gear segment 10. A secondary transfer mechanism, as hereinafter described, would be enabled at this point in the operation. Bail 14 is then rocked counterclockwise by suitable mechanism (not shown) which is well known in the art, while the lower edge of arm 10a is in engagement therewith. The rocking movement rotates gear segment 10 counterclockwise to the position of the front gear segment of FIG. 6, to thereby enter one unit into the engaged register pinions 5, 6. The cradle 9 is then raised to its normal position of FIG. 1, so that pinions 5 and 6 are taken out of engagement with actuator segments 10 while the actuator segments are held by bail 14. This prevents the segments from moving and ruining the setting of the register wheels. Bail 14 is then restored to the normal position of FIG. 1.

During the aforementioned operation, as soon as pinions 5 and 6 are removed from the engagement with the racks, lever 16 will be rocked clockwise toward its home position of FIG. 1 under the biasing action of spring 18 (which is connected between the lever and support member 19), but since segment 10 has been rotated to the position of FIG. 2, projection 20 will engage edge 16a of lever 16 to prevent the segment from returning to its home position. Then as segment 10 is rotated to the normal position of FIG. 1, lever 16 will be rocked further clockwise so that projection 20 will reengage notch 21 to lock the segment in its normal position.

Although a primary transfer operation in one order has been described, it will be obvious that bail 14 will simultaneously effect transfer operations in all orders wherein the transfer mechanism has been conditioned by digital registration in the respective next lower order.

The above discussion of the primary transfer mechanism has been done with only brief reference to the secondary transfer mechanism, since the primary transfer mechanism is enabled before the secondary transfer mechanism, but it will be appreciated that both primary and secondary transfers take place simultaneously.

The following is a discussion of the secondary transfer mechanism. If a series of pinions 5 or 6 stand at 9 registering position and the next lower order pinion passes through 9 registering position, the lowest order pinion of the series will be moved to zero in a primary transfer operation, as previously described, and all of the higher order pinions of the series will be moved to 0 in secondary transfer operations. The secondary transfer operation will also add one unit to the next higher order wheel from the series. As previously described, both secondary and primary transfer operations are effected simultaneously.

Associated with each order of pinions 5, 6 and with each segment 10 is a shiftable or slidable connecting member 22, one of which is vertically disposed between each two adjacent segments 10. Since these members are only located between segments, there will be one less than the number of segments employed.

Members 22 are normally held in the raised inoperative position of FIGS. 1, 2, 3 and 5 by tension springs 24, which extend between shaft 11 and projection 25 on the bottom of the upper inside edge of the central opening in members 22. A projection 22a at the upper end of each member 22 is directly below tooth extension 5a or 6a of the associated pinion 5 or 6 if they stand at the 9 registering position. In this position, when the pinions are shifted to the lowered position tooth extension 5a or 6a will contact projection 22a of member 22 to cause said member to be shifted along grooves 26, in shaft 11, to the lowered position of FIG. 6.

Figure 5:
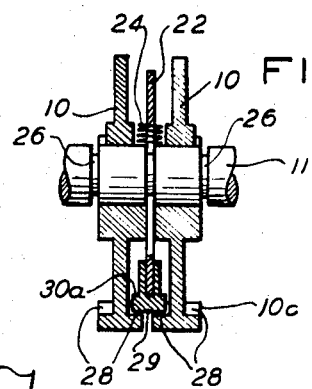
FIG. 5 is a sectional view taken on line 5—5 of FIG. 6.

In this lowered position, projecting section 27 of member 22 engages corresponding openings 28 in two adjacent segments 10 so that all three parts (the two segments and member 22) now function together as a unit. More specifically, (as shown in FIG. 5) the left side of nose 29 of the projecting section will engage either one of the two slots 28 in one segment, while the right side will engage either one of the two slots 28 in the immediately adjacent segment 10. The determination of which slot nose 20 engages will be discussed hereinafter. Also, the lower edges 30a of the upper part 30 of the projecting section will each engage the upper edges of the lower lips 10c of the two adjacent segments 10 so that a firm connection is formed between member 22 and these two segments. The same connection will take place in every order where the register wheels for the lower order of two adjacent segments stand at 9. By using this connection, the segments of all the orders involved will be enabled simultaneously. If one register wheel is not at 9, the member 22 between its segment and the next higher order segment will not be lowered to the enabled position.

It will be seen that if a primary transfer is about to take place, segment 10 has been spring biased to the position of FIG. 2 and nose 29 of projection 27 of member 22 will fit in the right slot 28, (FIG. 2) in segment 10, whereas if only a secondary transfer is to take place, segment 10 is in its normal position (FIG. 1), so that nose 29 of member 22 will fit in the left hand slot 28 (FIG. 1) in the segment.

Projection 32 of member 22 glides against the inside surface of bail 14 to aid in properly aligning member 22 as it slides to the lower position of FIG. 5.

When a segment 10 is rocked counterclockwise by bail 14 in a primary transfer operation, if there is a connection between it and the next higher order transfer segment by means of the respective connecting member 22 and a connection between that segment and the subsequent higher order segment and so on, all of these segments will be rocked counterclockwise (FIG. 6) to simultaneously advance the intermeshed register wheels one unit clockwise. If it is additive registration all interconnected orders that stand at 9 will thereby be advanced to 0 and one unit will be added to the next higher order and if it is subtractive registration, all interconnected orders that stand at 0 will be advanced to 9 and one unit will be imput to the next higher order register wheel.

It is noted that as the segments are being moved by bail 14 in a secondary transfer operation, projection 20 rides on surface 16b of lever 16 to guide and align the segments during this movement. The same guiding and aligning also takes place when the segments are being returned after a secondary transfer operation.

If pinion 5 or 6 of the overflow order, i.e., the highest order of the register (the leftmost order in FIG. 7 which illustrates the three highest orders of the register), is moved from 9 to 0 or vice versa in a secondary transfer, projection 12a on segment 10 of this overflow order will engage bail 13, which is a long thin member parallel to shaft 11 and positioned below transfer segments 22 while the other edge of bail 13 will engage projection 12b on the lowest order transfer segment. As the overflow segment is rotated counterclockwise, projection 12a thereon will rotate bail 13 counterclockwise and this will rotate projection 12b on the lowest order segment counterclockwise to thereby enter a fugitive one unit in the lowest order register pinions 5, 6. The reason for entering a fugitive one in the lowest order register pinions to achieve a correct answer in those pinions is well known in the art, and therefore needs no further explanation. The register pinions are then raised to the position of FIG. 1, thereby releasing connecting members 22, which then slide to their normal raised positions under the bias of springs 24. Disengagement of these members from slots 28 in segments 10, permits these segments that have been rocked to the position of the rear segment of FIG. 6 to return to their normal positions under the influence of springs 15. Upon returning to the normal position, segments 10 are reengaged by levers 16 and bail 14 is returned to the position of FIG. 1, to return the entire mechanism to its normal position.

For purposes of illustrating the operation of the register mechanism in both primary and secondary transfer operations, the movement of the mechanism will be described in the case where the value "999" stands in the three lowest orders of the register and "1" is added to the units order. The addition of this "1" will rotate gears 5, 6 to "0," which movement causes lever 16 to rotate in a counterclockwise direction from the position of FIG. 1 to the position of FIG. 2 to thereby release projection 20 of actuator 10. The actuator thereby rotates in the clockwise direction under the biasing influence of spring 15 to the position of FIG. 2.

Gears 5, 6 of all the orders are now simultaneously lowered to the position wherein the teeth of the gears engage the teeth of actuators 10.

Since gears 5, 6 for the tens and hundreds orders will be in the "9" position (according to the assumed problem), tooth extensions 5a, 6a of the register gears for the tens and hundreds orders will contact projections 22a of the respective members 22 between the tens and hundreds orders and between the hundreds and thousands orders to cause these members to slide to the lowered position of FIG. 5. In this lowered position, projection 29 of member 22 between the hundreds and thousands order will engage the left slots 28 of actuators 10 in the respective hundreds and thousands orders, whereas member 22 between the tens and hundreds order will have the left side of its projection 29 also engaging the left slot 28 in the actuator of the hundreds order as partially shown in FIG. 6, but the right side of its projection 29 will engage the right slot 28 of the tens order actuator because that actuator has been rotated to the position of FIG. 2 due to the release of member 16 by the addition of one unit to the units order register wheels.

Figure 6:
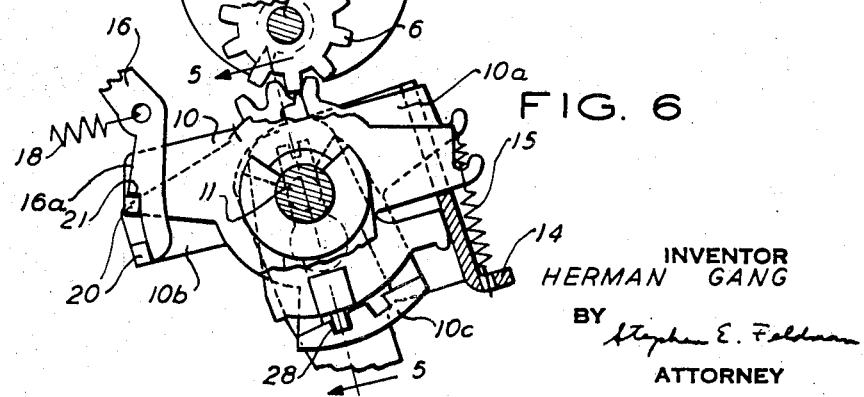
FIG. 6 is a partial view of the mechanism of FIG. 1, after a transfer has taken place, with parts broken away and removed.

Bail 14 is now moved counterclockwise to the position of FIG. 6. The engagement between arm 10a of segment 10 and the bottom of the slot in between the fingers of bail 14 causes the rotation of the segment. Because of the engagement between the teeth of the segment in the tens order and the teeth of the respective gears 5, 6, the rotation of the segment rotates gears 5, 6 to register one unit therein. The connection by means of member 22 between segment 10 of the tens order and segment 10 of the hundreds order and the similar connection by means of another member 22 between the segments of the hundreds and thousands orders causes the segments of the hundreds and thousands orders to also rotate in the counterclockwise direction to the position of FIG. 6, and due to the engagement between the teeth of these segments and the teeth of the gears 5, 6 in the hundreds and thousands orders these gears are rotated one unit in the clockwise direction. This movement takes place at the same time as gears 5, 6 of the tens order are advanced one unit due to the primary transfer, as aforementioned. Therefore, upon the addition of "1" in the units order to the figure "999," a primary transfer is effected from the units to the tens order and secondary transfer from the tens to the hundreds and from the hundreds to the thousands orders, all simultaneously, with the result that the number "1000" is now in the register gears.

After this registration is effected, gears 5 are raised to the normal position of FIG. 1 while bail 14 continues to remain in the counterclockwise position of FIG. 6, so that the actuators remain stationary until the gears 5, 6 are completely disengaged from the teeth of the actuators. By doing so, there is no chance of the actuators moving and ruining the setting of gears 5, 6.

Because gears 5, 6 have been disengaged from the actuators, (extensions 5a and 6a are no longer in contact with projections 22a of members 22) members 22 then begin to slowly rise to the normal raised position of FIG. 1 under the bias of springs 24.

After gears 5, 6 have been raised, bail 14 is then returned to the clockwise position of FIG. 1, whereupon springs 15 return the actuators other than the actuator which was rocked in a primary transfer to the normal position of FIG. 1. The actuator rocked in a primary transfer has already been moved to the normal position of FIG. 1 by the primary transfer as aforementioned. Detents 21 of levers 16 now reengage projections 20 on actuators 10 to lock them in the normal position, and thereby return the entire mechanism to the normal position.

The invention besides being applicable to an algebraic register, as disclosed, is also operable equally as well with other types of registers, including those that operate on other than the decimal system.

While a specific embodiment of my invention has been illustrated, it will be appreciated that my invention is not limited thereto, since many modifications may be made by one skilled in the art without departing from the spirit of the invention.

I claim:

1. A register mechanism comprising:
a register having an ordinal series of register wheels
transfer actuators associated with said register wheels, and
means which is moved by a change in position of the register for causing a part of a transfer operation.

2. The invention according to claim 1 wherein:
said part is the enabling of the transfer actuators.

3. The invention according to claim 1 wherein:
said change in position comprises a lateral shift of said register.

4. The invention according to claim 3 wherein:
said means is a shiftable member which connects a first and a second actuator so that when the first actuator is moved in a transfer operation to move its related register wheel, the second actuator will be moved in a secondary transfer operation to move its related register wheel.

5. The invention according to claim 3 wherein:
said means comprises a shiftable member which is moved into enabled position by being contacted by an extension of a related register wheel when that wheel is in a predesignated position.

6. The invention according to claim 5 wherein:
said shiftable member is located between adjacent actuators in a normally disabled position so that either adjacent actuator may be moved independently of the other and wherein when said member is moved to the enabled position it interconnects adjacent actuators so that movement of one actuator causes movement of the other.

7. The invention according to claim 4 wherein:
a primary transfer means is provided which is responsive to the movement of a lower order register wheel from a first to a second registering position to enable said first actuator for a primary transfer operation.

8. The invention according to claim 7 wherein:
said means for enabling an actuator for a secondary transfer operation is operable subsequent to said means for enabling an actuator for a primary transfer operation.

9. The invention according to claim 5 wherein:
a drive means for said actuators is provided which simultaneously moves all actuators that have been enabled and wherein this movement is done independently of said extensions of the register wheels.

10. The invention according to claim 7 in combination with a fugitive one mechanism for entering one unit in the lowest order wheel under control of the highest order wheel, comprising a rockable bail which is movable by the highest order actuator to move the lowest order actuator when the highest order register wheel is moved to a predesignated position.

11. The invention according to claim 9 wherein:
said drive means comprises a bail which is common to all actuators.

12. The invention according to claim 11 wherein:
biasing means is provided which moves an actuator to an enabled position for a primary transfer and returns an actuator to its normal position after a secondary transfer.

13. A register mechanism comprising:
a register having an ordinal series of register wheels,
transfer actuators which are movable during a transfer operation and which are engageable with said register wheels,
means for causing a part of a transfer operation by a change in position of the register,
and wherein said register wheels remain stationary with respect to the register during the change in position of said register.

14. A register mechanism comprising:
a register having an ordinal series of register wheels, and
a mechanism which is at least part of a tens transfer mechanism including:
means engaged by a portion of a register wheel for conditioning the registers for a tens transfer operation,
said means contacting a portion of a register wheel during a change in position of the register to cause part of a transfer operation.

15. A register comprising:
(a) a series of ordinally arranged numeral wheels adapted for movement as a series between two positions;
(b) a member adapted to be positively displaced, and disposed for coaction with said numeral wheels during said movement to accomplish a part of a transfer operation.

References Cited

UNITED STATES PATENTS

| | | | |
|---|---|---|---|
| 1,214,886 | 2/1917 | Brown | 235—135 |
| 2,635,812 | 4/1953 | Mehan | 235—137 |
| 2,694,524 | 11/1954 | Reynolds | 235—137 |
| 3,069,084 | 12/1962 | Barkas et al. | 235—137 |
| 3,102,688 | 9/1963 | Gang | 235—137 |
| 3,283,999 | 11/1966 | Chall | 235—137 |

RICHARD B. WILKINSON, Primary Examiner

S. A. WAL, Assistant Examiner